(12) United States Patent
Sandhar et al.

(10) Patent No.: US 12,409,641 B2
(45) Date of Patent: *Sep. 9, 2025

(54) FIRE-RESISTANT MULTI-LAYER MEMBRANE

(71) Applicant: BMIC LLC, Dallas, TX (US)

(72) Inventors: Gurpreet Singh Sandhar, Langley City (CA); Sahar Khedri, Langley City (CA)

(73) Assignee: BMIC LLC, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/540,380

(22) Filed: Dec. 14, 2023

(65) Prior Publication Data

US 2024/0123718 A1 Apr. 18, 2024

Related U.S. Application Data

(63) Continuation of application No. 17/211,666, filed on Mar. 24, 2021, now Pat. No. 11,865,821.

(51) Int. Cl.
*B32B 27/12* (2006.01)
*B32B 15/06* (2006.01)
(Continued)

(52) U.S. Cl.
CPC .............. *B32B 27/12* (2013.01); *B32B 15/06* (2013.01); *B32B 15/082* (2013.01); *B32B 27/32* (2013.01);
(Continued)

(58) Field of Classification Search
CPC ... B32B 15/06; B32B 15/082; B32B 2255/02; B32B 2255/06; B32B 2255/10;
(Continued)

(56) References Cited

U.S. PATENT DOCUMENTS

| 6,084,008 A | 7/2000 | Liu |
| 6,308,482 B1 | 10/2001 | Strait |

(Continued)

FOREIGN PATENT DOCUMENTS

| JP | 2002266477 A | 9/2002 |
| WO | 01/43972 A1 | 6/2001 |

(Continued)

OTHER PUBLICATIONS

Machine translation of JP 2002-266477, Imafuku et al., Sep. 18, 2002 (Year: 2002).*

*Primary Examiner* — Alicia Bland
(74) *Attorney, Agent, or Firm* — GREENBERG TRAURIG, LLP

(57) ABSTRACT

A multi-layer membrane with fire-resistant properties having improved thermal stability and shelf-life is provided. The multi-layer membrane 10 has at least a water resistant polymeric layer 12 bonded to a fire resistant component 13. The fire resistant component 13 has a first fire retardant coating 16 bonded to a carrier layer 14. The fire resistant component may further include a second fire retardant coating 28 bonded to a surface of the carrier layer opposite to the first fire retardant coating. The first and second fire retardant coatings comprise a filler 24, 30 mixed with a carrier 26, 32. The membrane may include a back bonding layer 36 bonded to the bottommost layer thereof to adhesively secure to a structural support structure such as a roof. A release liner 42 may be releasably secured to the back bonding layer. Additional layers may be included to provide for further support and/or additional functional properties to the membrane.

20 Claims, 4 Drawing Sheets

(51) Int. Cl.
*B32B 15/082* (2006.01)
*B32B 27/32* (2006.01)

(52) U.S. Cl.
CPC ............... *B32B 2262/0238* (2013.01); *B32B 2307/3065* (2013.01); *B32B 2307/7265* (2013.01)

(58) Field of Classification Search
CPC ............ B32B 2255/24; B32B 2255/26; B32B 2262/02; B32B 2262/0238; B32B 2262/101; B32B 2274/00; B32B 2307/3065; B32B 2307/7265; B32B 2307/744; B32B 2307/748; B32B 25/042; B32B 25/08; B32B 25/10; B32B 25/14; B32B 25/18; B32B 27/08; B32B 27/12; B32B 27/16; B32B 27/20; B32B 27/306; B32B 27/308; B32B 27/32; B32B 5/022; B32B 5/024; B32B 7/12
See application file for complete search history.

(56) References Cited

U.S. PATENT DOCUMENTS

| | | |
|---|---|---|
| 6,585,353 B1 | 7/2003 | Kanematsu et al. |
| 6,602,809 B1 | 8/2003 | Cabrey |
| 6,706,225 B2 | 3/2004 | Cabrey |
| 6,925,766 B2 | 8/2005 | Di Pede |
| 6,936,329 B2 | 8/2005 | Kiik et al. |
| 7,115,313 B2 | 10/2006 | Zanchetta et al. |
| 7,132,143 B2 | 11/2006 | Zanchetta et al. |
| 7,771,807 B2 | 8/2010 | Hubbard |
| 7,776,417 B2 | 8/2010 | Mohseen et al. |
| 7,914,868 B2 | 3/2011 | Naipawer, III et al. |
| 8,079,184 B2 | 12/2011 | Wiercinski et al. |
| 8,178,449 B2 | 5/2012 | La Vietes et al. |
| 8,765,251 B2 | 7/2014 | Strait |
| 8,932,497 B2 | 1/2015 | Gupta et al. |
| 8,968,853 B2 | 3/2015 | Zhou et al. |
| 9,144,954 B2 | 9/2015 | Li |
| 9,145,498 B2 | 9/2015 | Ultsch |
| 9,222,611 B2 | 12/2015 | Colasanto |
| 9,339,987 B2 | 5/2016 | Weinberg et al. |
| 9,415,563 B2 | 8/2016 | Li |
| 9,441,140 B2 | 9/2016 | Zhou et al. |
| 9,523,203 B2 | 12/2016 | Zhou et al. |
| 9,611,639 B2 | 4/2017 | Wang et al. |
| 9,683,135 B2 | 6/2017 | Zhou et al. |
| 9,920,200 B2 | 3/2018 | Zhou et al. |
| 10,030,325 B2 | 7/2018 | Arthurs |
| 10,065,394 B2 | 9/2018 | Tang et al. |
| 10,132,082 B2 | 11/2018 | Tang et al. |
| 10,167,637 B2 | 1/2019 | Hubbard |
| 10,232,585 B2 | 3/2019 | Seth et al. |
| 10,273,693 B2 | 4/2019 | Zhou et al. |
| 10,301,828 B2 | 5/2019 | Shepherd |
| 10,370,854 B2 | 8/2019 | Tang et al. |
| 10,385,572 B2 | 8/2019 | Granovsky |
| 10,443,190 B2 | 10/2019 | Wenstrup |
| 10,457,027 B2 | 10/2019 | Hauber et al. |
| 10,508,193 B2 | 12/2019 | Zhou et al. |
| 10,519,663 B2 | 12/2019 | Tang et al. |
| 10,655,331 B2 | 5/2020 | Mallick et al. |
| 10,696,024 B2 | 6/2020 | Leatherman et al. |
| 2005/0053746 A1* | 3/2005 | Bartek ............... B32B 25/00 156/289 |
| 2005/0136761 A1 | 6/2005 | Murakami et al. |
| 2005/0227086 A1 | 10/2005 | Murphy |
| 2010/0233408 A1 | 9/2010 | Zickell et al. |
| 2011/0011021 A1 | 1/2011 | LaVietes et al. |
| 2014/0205789 A1 | 7/2014 | Zhou et al. |
| 2015/0197784 A1 | 7/2015 | Williams et al. |
| 2015/0306850 A1 | 10/2015 | Hubbard et al. |
| 2015/0307748 A1 | 10/2015 | Zhou et al. |
| 2016/0002929 A1 | 1/2016 | Wang et al. |
| 2017/0030081 A1 | 2/2017 | Zhou et al. |
| 2017/0036430 A1 | 2/2017 | Hubbard et al. |
| 2017/0067257 A1 | 3/2017 | Zhou et al. |
| 2017/0175326 A1 | 6/2017 | Zhou |
| 2017/0191271 A1 | 7/2017 | Wang et al. |
| 2017/0210089 A1 | 7/2017 | Ennis |
| 2017/0267896 A1 | 9/2017 | Zhou et al. |
| 2017/0275500 A1 | 9/2017 | Zhou et al. |
| 2017/0298201 A1 | 10/2017 | Zhou et al. |
| 2018/0023287 A1 | 1/2018 | Chen et al. |
| 2018/0119424 A1 | 5/2018 | Khan et al. |
| 2018/0179385 A1 | 6/2018 | Zhou et al. |
| 2018/0297334 A1 | 10/2018 | Delaney et al. |
| 2018/0305931 A1 | 10/2018 | Zhou et al. |
| 2018/0326702 A1 | 11/2018 | Zhou et al. |
| 2019/0105868 A1 | 4/2019 | Zhou et al. |
| 2019/0226213 A1 | 7/2019 | Zhou et al. |
| 2019/0344542 A1 | 11/2019 | Seth |
| 2019/0344543 A1 | 11/2019 | Seth |
| 2020/0063437 A1 | 2/2020 | Zhou et al. |
| 2022/0364367 A1 | 11/2022 | Carr et al. |

FOREIGN PATENT DOCUMENTS

| | | |
|---|---|---|
| WO | 2009/009667 A1 | 1/2009 |
| WO | 2014/011977 A1 | 1/2014 |
| WO | 2021/003327 A1 | 1/2021 |

\* cited by examiner

FIRE-RESISTANT MULTI-LAYER MEMBRANE

RELATED APPLICATIONS

The present application is a continuation of U.S. patent application Ser. No. 17/211,666, filed Mar. 24, 2021, now U.S. Pat. No. 11,865,821, entitled "FIRE-RESISTANT MULTI-LAYER MEMBRANE," which is incorporated herein by reference in its respective entirety for all purposes.

FIELD OF THE INVENTION

The invention pertains to multi-layer membranes, and in particular, multi-layer membranes with fire-resistant properties for use in various applications, including for example as roofing and flooring underlayments.

BACKGROUND OF THE INVENTION

Multi-layer membranes are known in the art. One of the challenges surrounding the manufacture of multi-layer membranes is their stability upon exposure to severe weathering. For example, the layers within the membrane could delaminate from each other upon exposure to high temperatures. It is desirable for a multi-layer membrane to maintain stability under severe weathering. The present invention is directed to improved multi-layer membranes with fire-resistant properties.

SUMMARY

One aspect of the invention provides a multi-layer membrane with high thermal stability, i.e., the membrane being capable of maintaining its structure when exposed to adverse weathering such as at temperatures of below −20° C. and greater than about 60° C. for periods of greater than 12 months. A multi-layer membrane with high thermal stability allows its layers to remain bonded with each other without delamination after being exposed to adverse weathering.

The multi-layer membrane has at least a polymeric layer containing a water-resistant coating bonded to a fire resistant component. The fire resistant component has at least a first fire resistant coating bonded to a carrier layer. The water resistant polymeric layer may be bonded to the first fire resistant coating or the carrier layer. Some embodiments of the invention include a second fire resistant coating bonded to the carrier layer on a surface opposite to the first resistant coating. An outer surface of the water resistant polymeric layer which is arranged to be exposed to the environment may be mechanically and/or chemically modified to provide slip resistance. In some embodiments, a sacrificial anti-slip layer is arranged on the outer surface of the water resistant polymeric layer. In such embodiments, an outer surface of the anti-slip layer may be mechanically and/or chemically modified to provide slip resistance, while the outer surface of the water resistant polymeric layer remains smooth. The multi-layer membrane may be applied on a surface of a structural support member (e.g., a roof) by means of mechanical fasteners, or adhesive. In some embodiments, the multi-layer membrane further includes a back bonding layer bonded to the second fire resistant coating or the carrier layer to provide self-adhesive properties. In such embodiments, the back bonding layer is releasably attached to a release liner. Some embodiments of the invention include a support fabric bonded between the water resistant polymeric layer and the fire resistant component. A middle bonding layer may be bonded between the support fabric and the fire resistant component.

Further aspects of the invention and features of specific embodiments of the invention are described below.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

DETAILED DESCRIPTION

Figure 1:
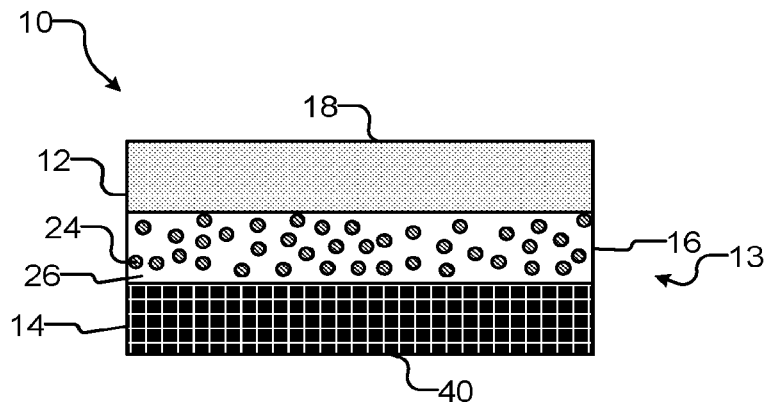
FIG. 1 is a schematic diagram of a multi-layer membrane according to a first example embodiment.
Figure 2:
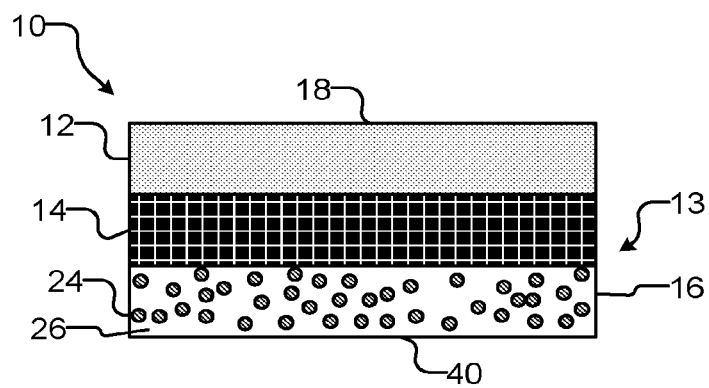
FIG. 2 is a schematic diagram of a multi-layer membrane according to a second example embodiment.

The invention provides multi-layer membranes with fire resistant properties. The multi-layer membranes of this invention achieve a Class A rating when tested according to UL 790 and/or ASTM E-108 Standard Test Methods for Fire Tests of Roof Coverings. Referring to FIGS. 1 to 5, the multi-layer membrane 10 has a water resistant polymeric layer 12 positioned at a top layer arranged to be exposed to the environment and a fire resistant component 13 bonded to the water resistant polymeric layer 12. The fire resistant component 13 comprises a carrier layer 14 bonded to a first fire resistant coating 16. In some embodiments, the first fire resistant coating 16 is bonded between the water resistant polymeric layer 12 and the carrier layer 14 (as shown in FIG. 1). In some embodiments, the carrier layer 14 is bonded between the water resistant polymeric layer 12 and the first fire resistant coating 16 (as shown in FIG. 2). The water resistant polymeric layer 12 may comprise one or more thermoplastic components to form a water resistant coating, and the coating optionally further includes organic and/or inorganic fillers, colorants, ultraviolet light absorbers, dyes, pigments and other suitable additives. The thermoplastic component may be any suitable plastic polymer material including for example polyolefin such as polypropylene and polyethylene, polyolefin elastomers such as thermoplastic elastomers (TPE), ethylene vinyl acetate (EVA) polymers, and/or acrylic polymers such as resins that include methylacrylate. The weight of the water resistant polymeric layer 12 may be in the range of from about 10 gsm to about 80 gsm. In an example embodiment, the water resistant polymeric layer 12 comprises about 50% to about 80% by weight of polypropylene, about 15% to about 30% by weight of low density polyethylene (LDPE), about 0.5% to about 8% by weight of UV additives, and about 0.5% to about 12% by weight of colorants.

An outer surface 18 of the water resistant polymeric layer 12 may be chemically and/or mechanically modified so as to provide slip resistance properties. For example, the outer surface 18 may be embossed with a texture. An embossed surface includes a plurality of depressed portions and elevated portions. The outer surface 18 may alternatively be coated with an anti-slip additive such as thermoplastic polyolefin (TPO), thermoplastic elastomers (TPE), ethylene-vinyl acetate (EVA), Reptyle FX™, foaming agents, calcium carbonate ($CaCO_3$), sand, and lace coating.

The carrier layer 14 may be made of any thermally resistant materials, e.g., materials with low thermal diffusivity. Examples of materials with low thermal diffusivity include metal foil or film such as aluminum foil, woven (e.g., plain weave, twill weave, or satin weave) or non-woven fiberglass, polyvinyl chloride (PVC), silicone rubber, felt (e.g., carbonized felt), polymeric fleece (e.g., polyethylene terephthalate (PET) fleece), other non-woven polymeric material including fabrics made by a needle-punch process, and fire retardant mats (e.g., an expandable graphite mat). The weight of the carrier layer 14 may be in the range of from about 100 gsm to about 1,000 gsm. In an example embodiment, the carrier layer 14 is made of woven fiberglass which contains 100% silicon dioxide.

Figure 3:
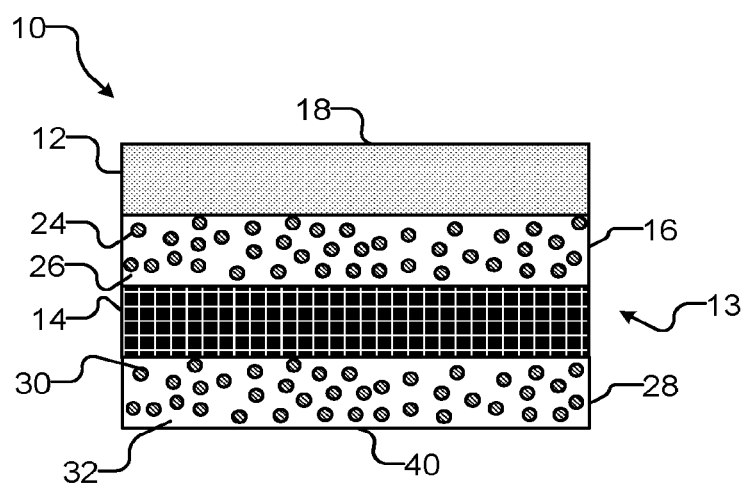
FIG. 3 is a schematic diagram of a multi-layer membrane according to a third example embodiment.

The first fire resistant coating 16 includes a first filler 24 mixed with a first carrier 26. In some embodiments, the fire resistant component 13 includes two layers of fire resistant coating, with the first fire resistant coating 16 and a second fire resistant coating 28 bonded to opposing surfaces of the carrier layer 14 as illustrated in FIG. 3. The second fire resistant coating 28 has a second filler 30 mixed with a second carrier 32. The second fire resistant coating 28 may have the same composition as or a different composition from the first fire resistant coating 16, i.e., the materials used for the first and second fillers 24, 30 and/or the first and second carriers 26, 32 and the amounts contained therein may be the same or different. The first and second fire resistant coatings 16, 28 apply onto opposing surfaces of the carrier layer 14 to form three separate layers. The first and second fire resistant coatings 16, 28 may be applied onto opposing surfaces of the carrier layer 14 when the coatings 16, 28 are in liquid or molten form. In some embodiments, the carrier layer 14 is free from any fire resistant coatings 16, 28, i.e., the carrier layer 14 is not impregnated with any fire resistant coatings 16, 28. In some embodiments, the carrier layer 14 contains less than about 20% of fire resistant coatings 16, 28 impregnated therein.

The first and second fillers 24, 30 are made of substances that have fire resistant properties. In some embodiments, the first and second fillers 24, 30 are made of an intumescent substance, such as expandable graphite, ammonium polyphosphate (APP), melamine (MEL), boric acid, bisphenol A (BPA) and polyamide amine, or combinations thereof. Intumescent substances expand when they are heated beyond an onset temperature, thereby creating a foamed cellular charred layer on the surface. This foamed layer has low thermal diffusivity and therefore retards the spread of fire. In some embodiments, the onset temperature of the first and/or second filler 24, 30 is at least 160° C., in the range of from about 180° C. to about 200° C.

The first and second fillers 24, 30 can, however, be any inorganic and/or organic fillers. Examples of suitable inorganic fillers include titania, clay, silica, fumed silica, alumina ($Al_2O_3$), aluminum trihydrate-ATH ($Al(OH)_3$) and combinations thereof. Examples of suitable organic fillers include halogenated flame retardant, non-halogenated flame retardant, other olefinic fillers and combinations thereof.

Any materials suitable for binding the first and second fillers 24, 30 can be used as the first and second carriers 26, 32. The first and second carriers 26, 32 may be an organic or inorganic material. Examples of suitable materials for use as the first and second carriers 26, 32 include polyvinyl chloride (PVC), silicone, acrylic, polyurethane, ethylene propylene diene monomer rubber (EPDM rubber), ethylene-vinyl acetate (EVA) or epoxy carriers or resins. In some embodiments, a filler content in the first and second fire resistant coatings 16, 28 is in the range of from about 20% to about 80% by weight, and a carrier content in the first and second fire resistant coatings 16, 28 is in the range of from about 20% to about 80%. The weights of the first and second fire resistant coatings 16, 28 may be in the range of from about 20 gsm to about 250 gsm. In an example embodiment, the first and second fire resistant coatings 16, 28 comprise 60% by weight of expandable graphite as the fillers 24, 30, and 40% by weight of an acrylic binder as the carriers 26, 32.

Figure 4:
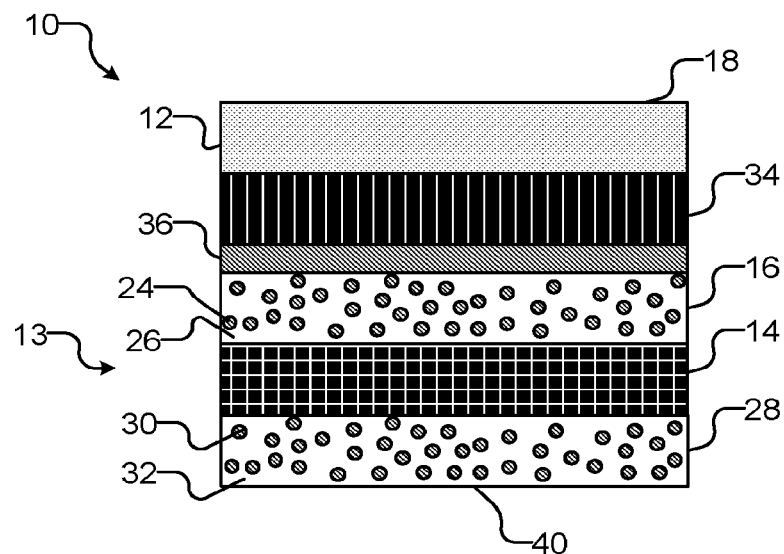
FIG. 4 is a schematic diagram of a multi-layer membrane according to a fourth example embodiment.

In some embodiments, the multi-layer membrane 10 further includes a support fabric 34 bonded between the water resistant polymeric layer 12 and the first fire resistant coating 16. The support fabric 34 may be bonded directly to the first fire resistant coating 16, or may be bonded to the first fire resistant coating 16 by a middle bonding layer 36, as illustrated in FIG. 4. In the latter embodiment, the support fabric 34 stabilizes the adhesion of the water resistant polymeric layer 12 to the middle bonding layer 36, facilitating a strong lamination between the water resistant polymeric layer 12 and the first fire resistant coating 16, reducing the likelihood of delamination of the water resistant polymeric layer 12 from the first fire resistant coating 16.

The support fabric 34 can be any suitable materials that can provide reinforcement to the membrane 10, such as a woven (e.g., plain weave, twill weave, or satin weave) or non-woven scrim or mat. Examples of suitable materials that can be used to form the support fabric 34 include fiberglass, polyolefin such as polypropylene (PP) or polyethylene (PE), and polyester such as polyethylene terephthalate (PET). The weight of the support fabric 34 may be in the range of from about 10 gsm to about 200 gsm. In an example embodiment, the support fabric 34 is made of woven fiberglass which contains 100% silicon dioxide. As another example, the support fabric 34 is a non-woven scrim such as a lay-up fabric.

Referring to FIGS. 6 to 10, the multi-layer membrane 10 optionally includes a sacrificial anti-slip layer 20 bonded to the outer surface 18 of the water resistant polymeric layer 12 such that the anti-slip layer 20 becomes the top layer that is arranged to be exposed to the environment. As used herein, a "sacrificial layer" means that the layer can be removed or omitted without affecting the functionality of the membrane. The anti-slip layer 20 may include a non-woven polymeric layer, and optionally combined with colorants, ultraviolet light absorbers, dyes, pigments and other suitable additives such as other anti-slip additives (e.g., thermoplastic polyolefin (TPO), thermoplastic elastomers (TPE), ethylene-vinyl acetate (EVA), Reptyle FX™, foaming agents, calcium carbonate ($CaCO_3$), sand, and lace coating) and fire resistant additives. The non-woven polymeric layer of the anti-slip layer 20 can be any suitable polymer, including for example polyolefin such as polypropylene and polyethylene, polyolefin elastomers such as thermoplastic elastomers (TPE), and polyesters such as polyethylene terephthalate (PET). An outer surface 22 of the anti-slip layer 20 may be smooth, or may be chemically and/or mechanically modified to provide further slip resistance properties. In embodiments in which a multi-layer membrane 10 includes the anti-slip layer 20, the outer surface 18 of the water resistant polymeric layer 12 is not chemically and/or mechanically modified, i.e., the water resistant polymeric layer 12 does not provide anti-slip resistance. The weight of the anti-slip layer 20 may be in the range of from about 15 gsm to about 220 gsm. In an example embodiment, the anti-slip layer 20 comprises about 80% to about 99% by weight of polypropylene, about 0.5% to about 8% by weight of UV additives, and about 0.5% to about 12% by weight of colorants.

Figure 5:
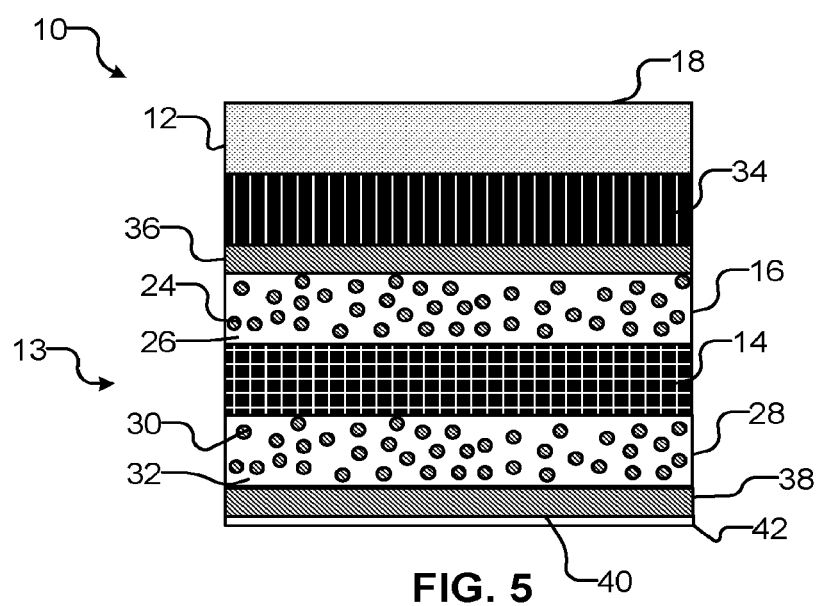
FIG. 5 is a schematic diagram of a multi-layer membrane according to a fifth example embodiment.
Figure 6:
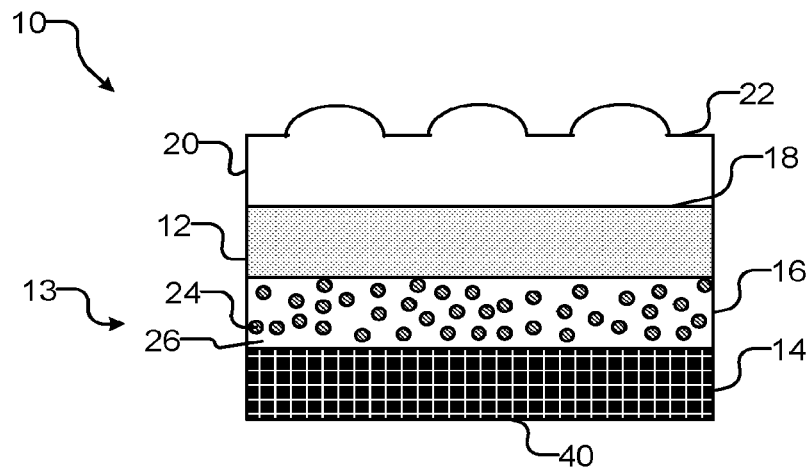
FIG. 6 is a schematic diagram of a multi-layer membrane according to a sixth example embodiment.
Figure 7:
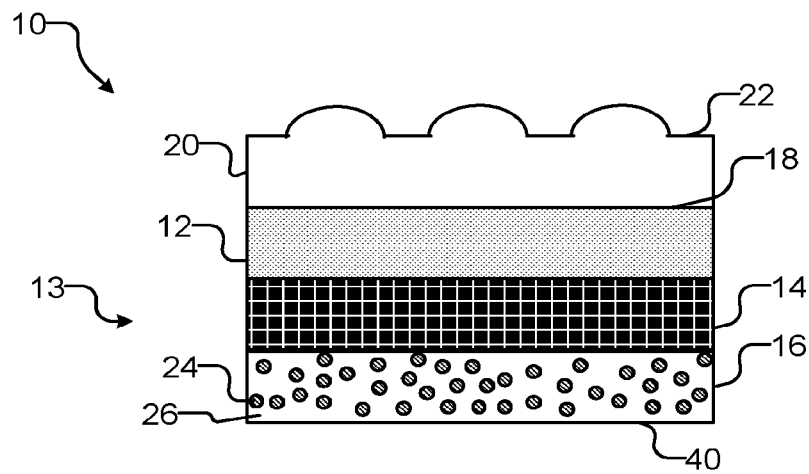
FIG. 7 is a schematic diagram of a multi-layer membrane according to a seventh example embodiment.
Figure 8:
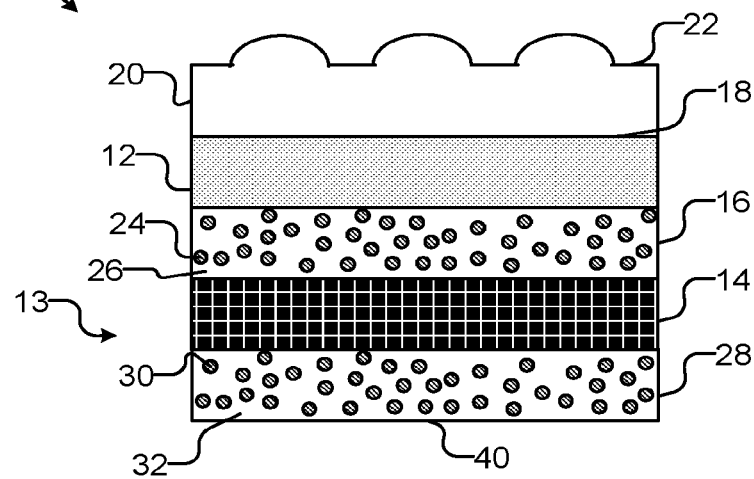
FIG. 8 is schematic diagram of a multi-layer membrane according to an eighth example embodiment.
Figure 9:
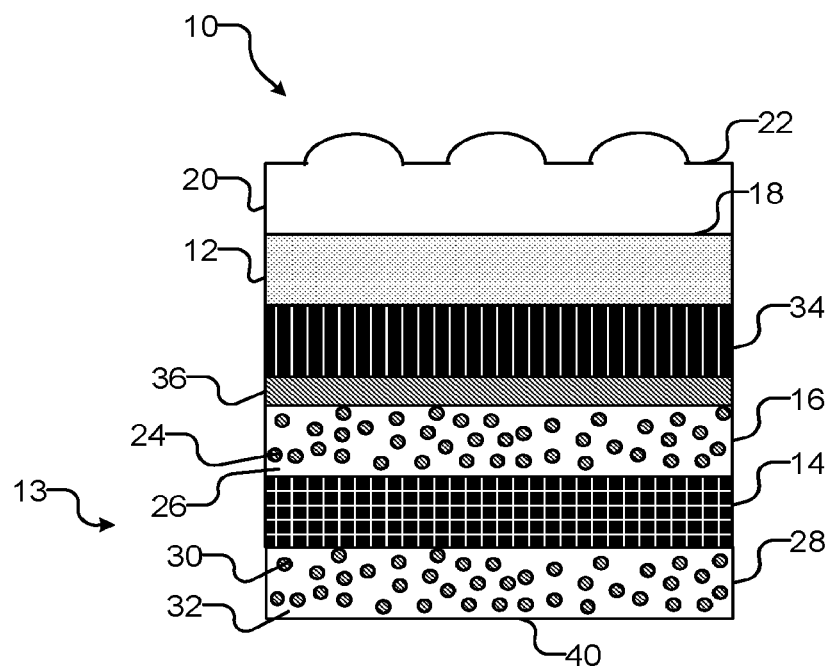
FIG. 9 is schematic diagram of a multi-layer membrane according to a ninth example embodiment.
Figure 10:
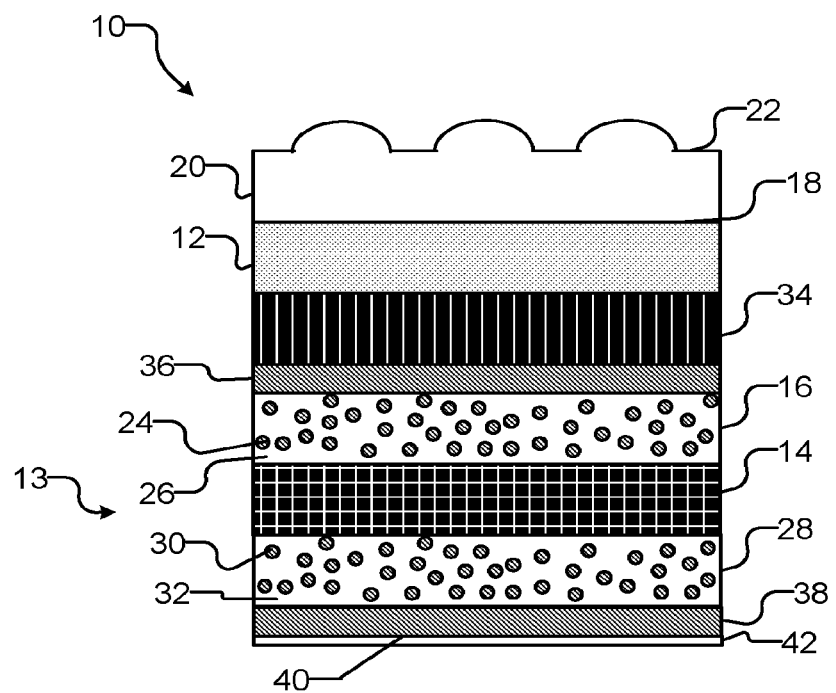
FIG. 10 is schematic diagram of a multi-layer membrane according to a tenth example embodiment.

The multi-layer membrane 10 may be installed onto a surface of a structural support member (e.g., a roof) by mechanically attaching it to the surface by means of for example mechanical fasteners that penetrate the multi-layer membrane 10 to engage the structural support member. The multi-layer membrane 10 may alternatively be attached to the surface of the structural support member by means an adhesive. In such embodiments, as shown in FIGS. 5 and 10, the multi-layer membrane 10 further includes a back bonding layer 38 adhered to a surface 40 of the bottommost layer of the multi-layer membrane 10 opposite to the water-resistant polymeric layer 12 or the anti-slip layer 20. In some embodiments (e.g., in the FIGS. 1 and 6 embodiments), the bottommost layer of the multi-layer membrane 10 is the carrier layer 14. In some embodiments (e.g., in the FIGS. 2 and 7 embodiments), the bottommost layer of the multi-layer membrane 10 is the first fire resistant coating 16. In some embodiments (e.g., in the FIGS. 3, 4, 8 and 9 embodiments), the bottommost layer of the multi-layer membrane 10 is the second fire resistant coating 28.

The middle and back bonding layers 36, 38 (if one or both are present in the multi-layer membrane 10) comprise an adhesive composition suitable for securing the support fabric 34 to the first fire resistant coating 16 and for securing the second fire resistant coating 28 to the structural support member respectively. In some embodiments, the middle and/or back bonding layers 36, 38 is made of a polymeric material such as a thermoset or a thermoplastic to form a pressure sensitive adhesive (i.e., an adhesive that forms a bond when pressure is applied to bond the adhesive with a surface) or a temperature sensitive adhesive (i.e., an adhesive which is activated by heat). In some embodiments, the middle and/or back bonding layer 36, 38 is made from butyl rubber or rubber modified asphalt (bitumen). In some embodiments, the middle bonding layer 36 is made from a polymeric bonding layer such as ethylene-vinyl acetate (EVA), Lotader™, thermoplastic elastomers (TPE), and/or thermoplastic polyolefin (TPO). In some embodiments, the middle and/or back bonding layers 36, 38 are free from inorganic fillers. The weight of the middle bonding layer 36 may be in the range of from about 20 gsm to about 500 gsm. The weight of the back bonding layer 38 may be in the range of from about 50 gsm to about 1,000 gsm. In an example embodiment, both the middle bonding layer 36 and the back bonding layer 38 comprise a rubber-based hot-melt pressure sensitive adhesive. The middle and back bonding layers 36, 38 may comprise the same adhesive composition, or different adhesive compositions.

In some embodiments, one or both of the middle and/or back bonding layers 36, 38 is free from rubber modified asphalt (bitumen). The presence of bitumen in the multi-layer membrane 10 can reduce the thermal stability of the overall membrane, and consequently lowering the shelf-life of the product.

A release liner 42 is releasably attached to the back bonding layer 38 for protecting the back bonding layer 38 until use. The release liner may be made of paper, polyolefins such as polypropylene (PP) or polyethylene (PE), or polyester such as polyethylene terephthalate (PET). One or both sides of the release liner may be coated with a release coating composition containing for example silicone.

Additional layers can be added to the multi-layer membrane 10 for purposes such as for providing further reinforcement. For example, an additional support fabric can be included in the multi-layer membrane 10, bonded between the middle bonding layer 36 and the first fire resistant coating 16. The additional support fabric increases the lamination strength between the water resistant polymeric layer 12 and the first fire resistant coating 16, and/or provides an interface between the anti-slip layer 20 and the first fire resistant coating 16. The additional support fabric may be made of a non-woven or woven polymeric layer, film, foil, non-woven, or woven mat.

The multi-layer membrane 10 can be applied on a variety of different surfaces such as plywood, oriented strand board (OSB), polyvinyl chloride (PVC), gypsum, thermoplastic polyolefin (TPO), ethylene propylene diene monomer rubber (EPDM rubber), metal and concrete, which makes it useful for various applications, such as flooring and roofing underlayments.

The multi-layer membrane of this invention passes each of the ASTM E 108 and UL 790 Standard Test Methods for Fire Tests of Roof Coverings, as well as one or more of ASTM D 1970 (Standard Specification for Self-Adhering Polymer Modified Bituminous Sheet Materials Used as Steep Roofing Underlayment for Ice Dam Protection), ICC ES AC 188 (Criteria for Roofing Underlayments), ICC ES AC 48 (Severe Climate), ASTM D226 (Standard Specification for Asphalt-Saturated Organic Felt Used in Roofing and Waterproofing), ASTM D4869 (Standard Specification for Asphalt-Saturated Organic Felt Underlayment Used in Steep Slope Roofing), CAN/CSA A123.3 (Asphalt saturated organic roofing felt), and TAS 103 (Test Procedure for Self-adhered Underlayments for use in Discontinuous Roof Systems).

The multi-layer membrane 10 has a total weight of greater than about 500 gsm, and ranging from about 500 gsm to about 2,000 gsm, and a thickness of greater than about 40 mils, and ranging from about 40 mils to about 70 mils. The membrane has a wide functional temperature range, extending from a low temperature at around −20° C. to a high of about 139° C. The membrane maintains thermal stability at a maximum temperature of greater than 90° C., and ranging from about 90° C. to 139° C. The tensile strength of the membrane may be greater than about 60 lb/in in the machine direction (MD) and in the cross-machine direction (CD), and ranging from about 60 lb/in to about 250 lb/in in the MD and in the CD. The elongation strength of the membrane is greater than about 40% in the MD and in the CD, and ranging from about 40% to about 100% in the MD and in the CD. The bonding strength of the membrane is greater than about 40 pounds of the back bonding layer per feet of plywood surface (lbs/ft), at temperatures of 4° C. and 23° C. The shelf life of the membrane is greater than about 12 months, and ranging from about 12 months to about 18 months. The above are results from tests conducted in accordance with ASTM D1970.

Example 1

A self-adhesive multi-layer membrane 10 with eight layers was made. The uppermost anti-slip layer 20 comprises 95% by weight of polypropylene, 3% by weight of UV additive, and 2% by weight of colorant, with a weight of 90 gsm. The water resistant polymeric layer 12 comprises 78% by weight of polypropylene, 20% by weight of low density polyethylene (LDPE), 2% UV additive, and 0% by weight of colorant, with a weight of 25 gsm. The middle bonding layer 36 is a rubber-based hot melt-pressure sensitive adhesive, with a weight of 200 gsm. The first and second fire resistant coatings 16, 28 contain 60% by weight of expandable graphite as the first and second fillers 24, 30 and 40% by weight of a binder containing acrylic, each having a weight of 100 gsm. The carrier layer 14 is made of a woven fiberglass which contains 100% silicon dioxide, with a weight of 630 gsm. The back bonding layer 38 is a rubber-based hot melt-pressure sensitive adhesive, with a weight of 460 gsm, and thickness of 12.5 mils. The release liner 42 is a double-sided polyethylene that is coated with silicone, with a weight of 50 gsm. The total weight and thickness of the multi-layer membrane 10 is 1655 gsm and 75 mils respectively.

This seven-layer membrane was tested to be in compliance with each of the following tests: ASTM E 108 UL 790, ASTM D 1970, ICC ES AC 188, ICC ES AC AC 48, and TAS 103-95.

The following are results from tests that were conducted in accordance with the above listed standard tests. The seven-layer membrane is nail-sealable (i.e., the membrane is capable of sealing around the nails) and has low water absorption (i.e., water absorbency of less than about 0.1% when tested in accordance with ASTM D5147). The membrane was found to maintain thermal stability at a maximum of 75° C. when tested against ASTM D1970. The tensile strength of the membrane is 148 lb/in in the machine direction (MD) and 163 lb/in in the cross-machine direction (CD). The elongation strength of the membrane is 106% in the MD and 84% in the CD. The bonding strength of the membrane is 8 pounds of the back bonding layer per feet of plywood surface (lb/ft) at −20° C., 100.9 lb/ft at 4° C. and 79.8 lb/ft at 23° C. The shelf life of the membrane is about 48 months and the outdoor exposure time is about 12 months.

Example 2

A self-adhesive multi-layer membrane 10 with nine layers of the type depicted in FIG. 10 was made. The uppermost anti-slip layer 20 comprises 95% by weight of polypropylene, 3% by weight of UV additive, and 2% by weight of colorant, with a weight of 90 gsm. The water resistant polymeric layer 12 comprises 78% by weight of polypropylene, 19% by weight of low-density polyethylene (LDPE), 2% UV additive, and 1% by weight of colorant, with a weight of 25 gsm. The support fabric 34 and the carrier layer 14 are made of a woven fiberglass which contains 100% silicon dioxide, having weights of 15 gsm and 630 gsm respectively. The first and second fire resistant coatings 16, 28 contain 60% by weight of expandable graphite as the first and second fillers 24, 30 and 40% by weight of a binder containing acrylic, each having a weight of 100 gsm. The middle and back bonding layers 36, 38 are a rubber-based hot melt-pressure sensitive adhesive, having weights of 200 gsm and 460 gsm, and thicknesses of 5 mils and 12.5 mils respectively. The release liner 42 is a double-sided polyethylene that is coated with silicone, with a weight of 50 gsm.

Throughout the foregoing description and the drawings, in which corresponding and like parts are identified by the same reference characters, specific details have been set forth in order to provide a more thorough understanding to persons skilled in the art. However, well known elements may not have been shown or described in detail or at all to avoid unnecessarily obscuring the disclosure.

As will be apparent to those skilled in the art in the light of the foregoing disclosure, many alterations and modifications are possible in the practice of this invention without departing from the scope thereof. Accordingly, the description and drawings are to be regarded in an illustrative, rather than a restrictive, sense.

What is claimed is:
1. A multi-layer membrane comprising:
an upper layer,
    wherein the upper layer is a non-woven polymeric layer,
        wherein the non-woven polymeric layer is embossed to form a plurality of protrusions;
a polymeric layer;
a support fabric,
    wherein the polymeric layer is positioned between the upper layer and the support fabric; and
a fire resistant component comprising:
    i) a first fire resistant coating comprising a first filler mixed with a first carrier, and
    ii) a carrier layer,
        wherein the first fire resistant coating is bonded to the carrier layer,
        wherein the support fabric is positioned between the fire resistant component and the polymeric layer, and
        wherein the first fire resistant coating is bonded to the support fabric.

2. The multi-layer membrane of claim 1, wherein the polymeric layer comprises one or more thermoplastic components selected from the group consisting of polypropylene, polyethylene, ethylene vinyl acetate (EVA) polymers, ethylene terpolymer sold under the tradename Lotader, acrylic polymers, and thermoplastic elastomers (TPE).

3. The multi-layer membrane of claim 1, wherein the fire resistant component further comprises a second fire resistant coating bonded to the carrier layer on a surface opposite to the first fire resistant coating, and wherein the second fire resistant coating comprises a second filler mixed with a second carrier.

4. The multi-layer membrane of claim 3, wherein at least one of the first or second fire resistant coating comprises a filler content in a range of from about 20% to about 80% by weight, and a carrier content in the range of from about 20% to about 80% by weight.

5. The multi-layer membrane of claim 3, wherein at least one of the first or second fire resistant coating comprises a filler content of 60% by weight, and a carrier content of 40% by weight.

6. The multi-layer membrane of claim 3, wherein at least one of the first or second filler is an inorganic filler.

7. The multi-layer membrane of claim 3, wherein at least one of the first or second filler is expandable graphite.

8. The multi-layer membrane of claim 1, wherein the carrier layer is made of a woven or a non-woven material selected from the group consisting of a metal foil or film, fiberglass, polyvinyl chloride (PVC), rubber, felt, polymeric fleece, non-woven polymeric material, and fire retardant mat.

9. The multi-layer membrane of claim 1, wherein the carrier layer is not impregnated with the first fire resistant coating.

10. The multi-layer membrane of claim 1, wherein the carrier layer is impregnated with the first fire resistant coating, and wherein the carrier layer contains not more than 20% by weight of the first fire resistant coating.

11. The multi-layer membrane of claim 3, further comprising a back bonding layer bonded to a bottommost layer of the multi-layer membrane, wherein the bottommost layer is the carrier layer or the first or second fire resistant coating.

12. The multi-layer membrane of claim 11, wherein the back bonding layer comprises a rubber polymer.

13. The multi-layer membrane of claim 11, further comprising a release liner releasably attached to the back bonding layer.

14. A multi-layer membrane comprising:
an upper layer configured to be exposed to the environment,
  wherein the upper layer is a non-woven polymeric layer,
    wherein the non-woven polymeric layer is embossed to form a plurality of protrusions;
a polymeric layer;
a support fabric,
  wherein the polymeric layer is positioned between the upper layer and the support fabric; and
a fire resistant component comprising:
  i) a first fire resistant coating comprising a first filler mixed with a first carrier, and
  ii) a carrier layer,
    wherein the support fabric is positioned between the fire resistant component and the polymeric layer, and
    wherein the first fire resistant coating is bonded to the support fabric.

15. The multi-layer membrane of claim 14, wherein the fire resistant component further comprises a second fire resistant coating, wherein the second fire resistant coating comprises a second filler mixed with a second carrier.

16. The multi-layer membrane of claim 15, wherein at least one of the first or second fire resistant coating comprises a filler content in a range of from about 20% to about 80% by weight, and a carrier content in the range of from about 20% to about 80% by weight.

17. The multi-layer membrane of claim 15, wherein at least one of the first or second fire resistant coating comprises a filler content of 60% by weight, and a carrier content of 40% by weight.

18. The multi-layer membrane of claim 14, wherein the carrier layer is not impregnated with the first fire resistant coating.

19. The multi-layer membrane of claim 14, wherein the carrier layer is impregnated with the first fire resistant coating, wherein the carrier layer contains not more than 20% by weight of the first fire resistant coating.

20. The multi-layer membrane of claim 14, wherein the first filler comprises an inorganic filler.

* * * * *